United States Patent
Bednash et al.

(10) Patent No.: US 12,216,779 B2
(45) Date of Patent: Feb. 4, 2025

(54) METHODS OF AND SYSTEMS FOR VIRTUAL AIR-GAPPING NETWORK STORAGE SYSTEM

(71) Applicant: RackTop Systems, Inc., Fulton, MD (US)

(72) Inventors: Eric Bednash, Fulton, MD (US); Jonathan Halstuch, Fulton, MD (US)

(73) Assignee: RackTop Systems, Inc., Fulton, MD (US)

( * ) Notice: Subject to any disclaimer, the term of this patent is extended or adjusted under 35 U.S.C. 154(b) by 579 days.

(21) Appl. No.: 17/519,124

(22) Filed: Nov. 4, 2021

(65) Prior Publication Data
US 2022/0156395 A1 May 19, 2022

Related U.S. Application Data

(60) Provisional application No. 63/113,666, filed on Nov. 13, 2020.

(51) Int. Cl.
*G06F 21/62* (2013.01)
*G06F 9/54* (2006.01)
*G06F 16/13* (2019.01)
*G06F 16/182* (2019.01)
*G06F 21/60* (2013.01)

(52) U.S. Cl.
CPC .......... *G06F 21/6218* (2013.01); *G06F 9/54* (2013.01); *G06F 16/137* (2019.01); *G06F 16/183* (2019.01); *G06F 21/602* (2013.01)

(58) Field of Classification Search
CPC ...... G06F 21/6218; G06F 9/54; G06F 16/137; G06F 16/183; G06F 21/602; G06F 9/5011; G06F 2221/2137; G06F 2221/2141
See application file for complete search history.

(56) References Cited

U.S. PATENT DOCUMENTS

| | | | |
|---|---|---|---|
| 7,293,133 B1 | 11/2007 | Colgrove et al. | |
| 10,503,610 B1 * | 12/2019 | Shemer | G06F 11/1464 |
| 10,558,581 B1 * | 2/2020 | Lazier | G06F 21/6218 |
| 11,216,566 B1 * | 1/2022 | Monakhov | G06F 21/78 |
| 2002/0161855 A1 | 10/2002 | Manczak et al. | |
| 2007/0038857 A1 * | 2/2007 | Gosnell | G06F 16/10 |
| | | | 713/165 |
| 2007/0136308 A1 | 6/2007 | Tsirigotis et al. | |
| 2007/0179995 A1 | 8/2007 | Prahlad et al. | |
| 2009/0106331 A1 * | 4/2009 | Fridman | G16Z 99/00 |
| 2013/0111262 A1 | 5/2013 | Taylor et al. | |
| 2013/0138908 A1 | 5/2013 | Iwasaki | |

(Continued)

*Primary Examiner* — Michael R Vaughan
*Assistant Examiner* — Ethan V Vo
(74) *Attorney, Agent, or Firm* — Carr & Ferrell LLP (57) ABSTRACT

A method of and system for virtual air-gapping of data in a network storage system. The method comprises creating a staging zone around a set of data within a global zone. The global zone is accessible over a network utilizing a network file system. The set of data is indexed generating a manifest containing metadata and a hash for each file within the set of data. The set of data and manifest is reallocated creating vaulted data. Access to the vaulted data is provided through an Application Programing Interface (API) configured to limit access to specified users and permissions which can exclude superusers. The API can be used to verify the vaulted data through recomputing the index manifest and hashes.

22 Claims, 4 Drawing Sheets

(56) References Cited

U.S. PATENT DOCUMENTS

| | | |
|---|---|---|
| 2013/0262394 A1* | 10/2013 | Kumarasamy ...... G06F 16/2264 |
| | | 707/673 |
| 2013/0282662 A1 | 10/2013 | Kumarasamy et al. |
| 2014/0006465 A1 | 1/2014 | Davis |
| 2015/0293699 A1 | 10/2015 | Bromley et al. |
| 2017/0005803 A1* | 1/2017 | Brownewell ......... G06F 16/248 |
| 2017/0075907 A1 | 3/2017 | Goswami et al. |
| 2017/0286437 A1* | 10/2017 | Stevens ................. G06F 16/137 |
| 2018/0239917 A1* | 8/2018 | Takano .................... H04L 9/10 |
| 2019/0205056 A1 | 7/2019 | Halstuch et al. |
| 2021/0240378 A1* | 8/2021 | Gurindapalli ......... G06F 3/0614 |
| 2022/0012134 A1* | 1/2022 | Chatterjee ........... G06F 11/1456 |
| 2022/0067193 A1* | 3/2022 | Singh .................... G06F 21/602 |
| 2022/0156396 A1 | 5/2022 | Bednash et al. |

\* cited by examiner

METHODS OF AND SYSTEMS FOR VIRTUAL AIR-GAPPING NETWORK STORAGE SYSTEM

CROSS-REFERENCE TO RELATED APPLICATIONS

The present application claims the benefit of the filing date of U.S. Provisional Patent Application Ser. No. 63/113,666, filed on Nov. 13, 2020 and entitled "Methods for and Systems for Virtual Air-Gapping Network Storage System." The aforementioned provisional patent application is hereby incorporated by reference in its entirety for all purposes.

TECHNICAL FIELD

This disclosure is related to the technical field of network, data, and computer security. More specifically, network data and computer security is provided by virtually air-gapping unstructured data into mutually inaccessible virtual data vault (data zones/sets) within a network-attached storage system.

BACKGROUND

In the past, to secure computing systems and networks from intrusion, attack, modification, unauthorized access, copying, and infection with malware, the system would be air-gapped from the outside world. An air-gapped system, which can contain one or more interconnected computer systems, is a system that is connected to itself but not connected to the outside world. In air-gapped systems, there are not any wired or wireless connections outside the system. An air-gapped system operates as a self-contained system and is a data island unto themselves. Data is transferred into and out of an air-gapped system by copying the data onto a physical transport media (disk, solid-state device, tape), physically transporting the media between air-gapped systems via human intervention, and physically inserting the media into a reading device on the air-gapped system for the purposes of performing certain operations, calculations, or data storage. The physical media and the data it contains may or may not be permanently destroyed as a matter of policy and process after the data transfer occurs. Transport media is usually write-once-read-many (WORM) media so that no changes of the data may occur during transport and transfer.

For example, a contractor might have a design for a new aircraft and want assurance that it is not possible for anyone to hack in and steal or modify the design being developed by a group of engineers. Or the system may have specialized software for determining the performance characteristics of a design where the stored software is proprietary and needs to be protected from copying. An air-gapped system is one solution for providing security whereby the risk of data theft, loss, or exposure is reduced by moving critical data into a system which is not, either electronically or physically, accessible by unauthorized devices (individuals, bots, software, computers, etc.).

One problem with air-gapped systems relates to the ever-increasing amounts of data coupled with the relatively small size of physical media and the speed at which external physical media devices (readers/writers) can copy data onto and off the media itself. Data sets and groups of files that once fit on a floppy disc now have grown to multiple terabytes. Data moved into an air-gapped system or transferred out of an air-gapped system requires placing the data information onto a physical medium, verifying the data, and physically moving the data. Further, the time to copy the data onto transferable media, verify the data and move the data is slow and impractical for the speed of modern business. Moving air-gapped data could take hours or days. What is needed are systems and methods to virtually airgap data and systems to virtually airgap data that are fast, reliable, subject to automation, and do not require the movement of physical storage media.

SUMMARY

A method of and a system for virtually air-gapping data in a network storage system is disclosed. The method includes selecting data and files that are to be virtually air-gapped. The data to be air-gapped is indexed to create a manifest containing metadata about the files. In a further step, the data can be encrypted for protection. Next, the data along with the manifest are reallocated such that the data cannot be accessed by the data server. The vaulted data on the data server cannot be mounted or read except through an Application Programming Interface (API) on the Data Server. Even a superuser is not able to mount or access the data in the Data Vault Zone. All access and control of the vaulted data is provided through the API. Only the owner of the data can access the data. Before or after moving the data to the Data Vault Zone, the data can be indexed which generates a manifest that can contain hashes for each file. After the data is reallocated to the data vault zone, it can be verified using the manifest. Further, the vaulted data can be encrypted for additional protection. The encryption key can be managed by the owner of the data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

Exemplary embodiments are illustrated by example and not limitation in the figures of the accompanying drawings, in which like references indicate similar elements.

DETAILED DESCRIPTION OF EXEMPLARY EMBODIMENTS

Exemplary embodiments are illustrated by example and not limitation in the figures of the accompanying drawings, in which like references indicate similar elements.

Figure 1:
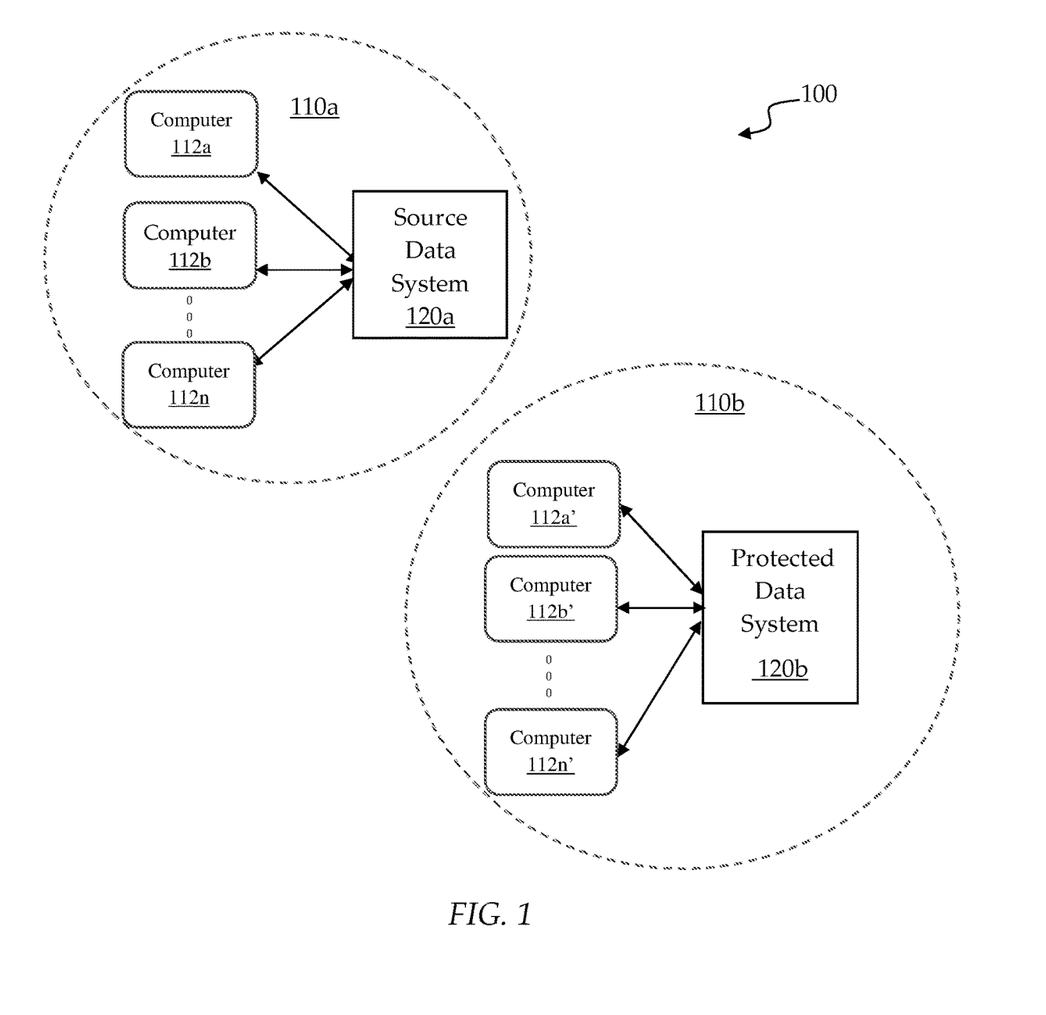
FIG. 1 is a block diagram of a physically air-gapped system.

FIG. 1 shows the configuration of a prior art air-gapped system 100. There is a SDN (Source Data Network) 110a which provides access to source data, typically found on a SDS (Source Data System) 120a. The data is typically accessed by computers 112a-112n coupled to the SDS 120a using a network file system and a Network Attached Storage or network data server. Additionally, there is a PDN (Protected Data Network) 110*b*, which provides access to protected data (air-gapped data), typically found on a PDS (Protected Data System) 120*b*. This forms an air-gapped system. For an air-gapped system 100 there are no wires, optical, wireless, or other data communication connections between the SDN 110*a* and PDN 110*b*.

To move data between the SDS 120*a* and PDS 120*b*, the data is transferred to an electromechanical device, but the data needs to be staged, reviewed, and audited on an intermediary system by humans. Then the electromechanical device, once loaded with the airgap data, can be transferred to and loaded onto the PDS 120*b*.

Figure 2:
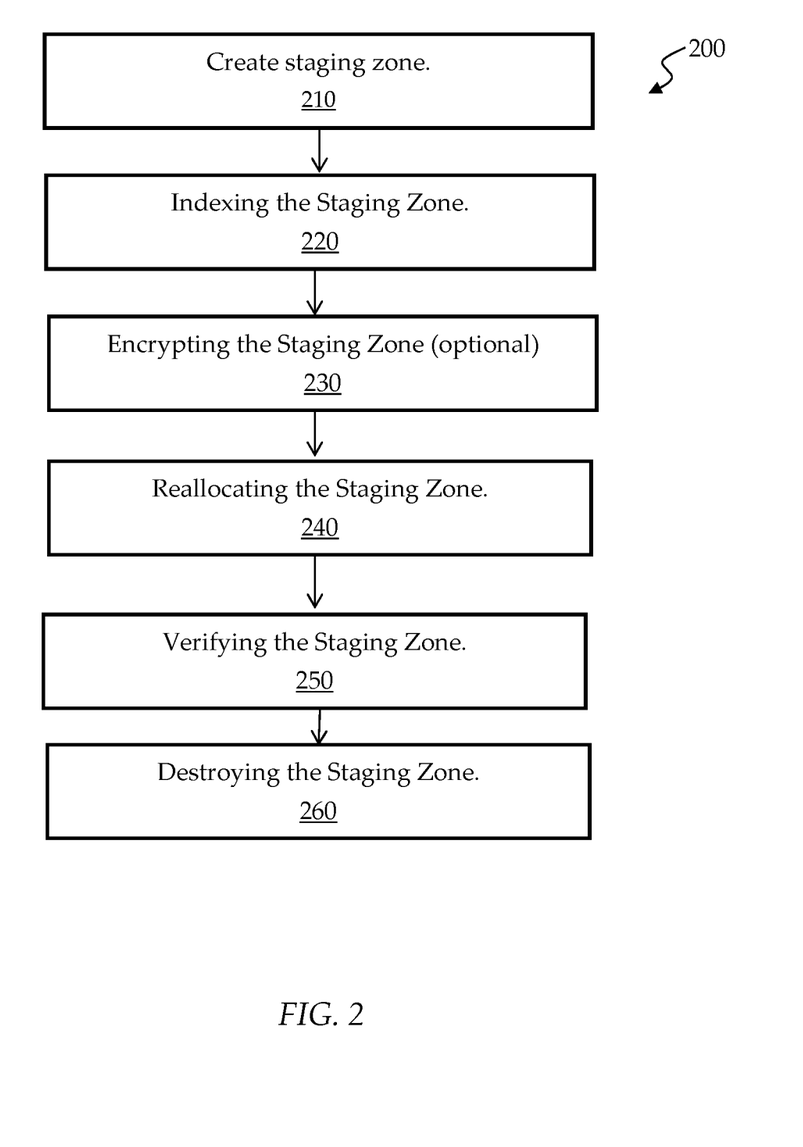
FIG. 2 is a flow chart of an example method of virtually air-gapping system data.

Referring to FIG. 2, a method of virtually air-gapping global data within a networked file system 200 into a data vault zone is shown and described. In a first step 210, a staging zone is defined and generated. A staging zone can be defined as a set of unstructured data, a tree of directories, a set of files, or a combination thereof that reside on a networked data server. This data comes from a global data zone or global zone that is data stored in the Network Storage System and can be accessed by network computers over a network interface and that have permissions to access this data. The global data zone is not an area where any computer can access. The global data zone is where users, over the network, can mount files located on the Network Storage System.

The Staging Zone includes data from the global data zone comprising unstructured data, trees of directories, files associated with the trees of directories, files, or a combination thereof. The Staging Zone can be a logical association of the data, or a copy of the data can be replicated on the storage system, within the Staging Zone. Data within the Staging Zone can have permissions and access limitations with restrictions to a limited set of users, systems, or computers which can be responsible for staging, loading, or specifying the data to be virtually air-gapped into the data vault zone.

Specification of the data to be virtually air-gapped (tree of directories, files associated with the tree of directories, a set of files, or a combination thereof) can be specified through at least one or more of virtual airgap specification files, through a user interface, a script, a serialized metadata file (XML, JSON, TOML, YAML, etc.), a user command line, or a combination thereof.

This access by the users, systems, or computers to generate air-gapped data can be time-limited. The time limit can be made by specifying a time window, periodic time window (the first of the month), or for a period in the future. Further, the access can be limited to one or more users or computers and can be controlled through an Application Programming Interface (API), which itself may be limited to a user or a user with specific permissions.

Network-connected computers typically connect to the file server to access data within this global data zone at high speed (1 Gb/sec to 100 Gbit/sec). Data within the global zone is restricted to a data owner (the responsible party for the data), and access is controlled by user credentials or computer system IP addresses, which allows any authorized users to access this global data zone. A staging zone defines the data that is to go through a virtual mantrap and be virtually air-gapped. This data is a subset of the data within the global zone. The defining of the staging zone is the equivalent of opening the first door of the mantrap.

In a step 220, the set of data in the staging zone can be indexed generating a manifest. Indexing provides two features. Once the data is in the data vault zone, the only way of knowing what data is in the data vault zone (files, trees of files) is referencing is through the metadata stored in a manifest. A user or system accesses the vault data zone through an Application Programming Interface (API) and the API can use the manifest to reference, find, access, and validate the vaulted data. There is no direct visibility for a system outside the data vault zone to access the structure of the vaulted data. Thus, a copy of the manifest may be kept outside the data vault zone. Also, the data vault may keep a copy of the manifest which can be provided to the owner of the data through the API.

A manifest consists of one or more files that are a result of indexing the data in the staging zone. The indexing can be performed as part of the staging process, or the indexing can be performed externally on another system, for example on the computer where the source data resides. The manifest includes entries for each file to be air-gapped, with each entry containing some file metadata (name, size, directory path, etc.) and can include one or more hashes for validating the data, directory trees, and files. Validation can occur before or after virtual air-gapping the data. The hashes can be used to validate the data during the vaulting process or when data is retrieved from the API.

If the manifest is created externally, the manifest or a copy of the manifest needs to be included with the data that is reallocated and forming the data vault zone. Indexing can be implemented by any known indexing technique as long as the resultant manifest follows the prescribed format that is known or understood by the airgap API. This enables the comparison of the manifest before virtually air-gapping with the manifest after virtual air-gapping. The indexing produces an immutable manifest that can be used by the system in verifying and accessing the data in the data vault zone.

In an optional step 230, the data in the staging zone can be encrypted by the data owner. This step can be seen as a partial closing of the door on the virtual man-trap. The staging zone data is then protected by encryption. If the original data was encrypted, then a different encryption key can be used. This data can be an encrypted copy of the staging zone data.

The owner of the data, which can be a user or system, maintains a copy of the encryption key. This key is required if the user retrieves data from the data vault zone that is encrypted. Alternatively, the encryption key can be provided through the API for requested data to be decrypted before being provided to a user.

Next, in a step 240, the staging zone is reallocated using the functions of the network file system, the operating system, or a combination thereof. The techniques for reallocation can be the same as used by virtual operating systems or containers to isolates system resources except here the isolation for reallocating is limited data storage. A person skilled in the art of creating virtual computing machines would be able to provide this function. This isolated data, referred to as vaulted data, is logically disconnected and separated from the system. Before reallocation, computers on the network can access data in the global zone and the staging zone. The reallocation is a non-standard inventive feature of the operating system and network file system that transforms the data within the staging zone to be invisible, non-accessible, and unable to be read from, written to, deleted, or executed by any computer on the network accessing the data server. This is true for even superusers. Data in the data vault zone cannot be mounted by any of the computers and access is limited through the server API that limits the access to a data owner. Only users that have permission through the API to access the data vault zone, can receive the vaulted data. This can be considered the equivalent of closing the door in a virtual mantrap. The data in the data vault zone is isolated from the global network including users with administrator or superuser privileges.

In a step 250, the staging zone data is verified. This verification can include validating the data in the manifest. This can include matching file name, tree structures, file sizes, and recomputing hashes and comparing the computed hash values with the hash values in the manifest.

In a step 260, the data in the Staged Zone is destroyed. Destroying the data can include deleting the data, overwriting the underlying file system used to store that data, overwriting the physical media area where the data was written, or physically destroying the media where the data was stored. Where the vault data is disconnected from the file system, deleting can include any clean-up of the file system needed to prevent inconsistencies in the operating and file system.

Figure 3:
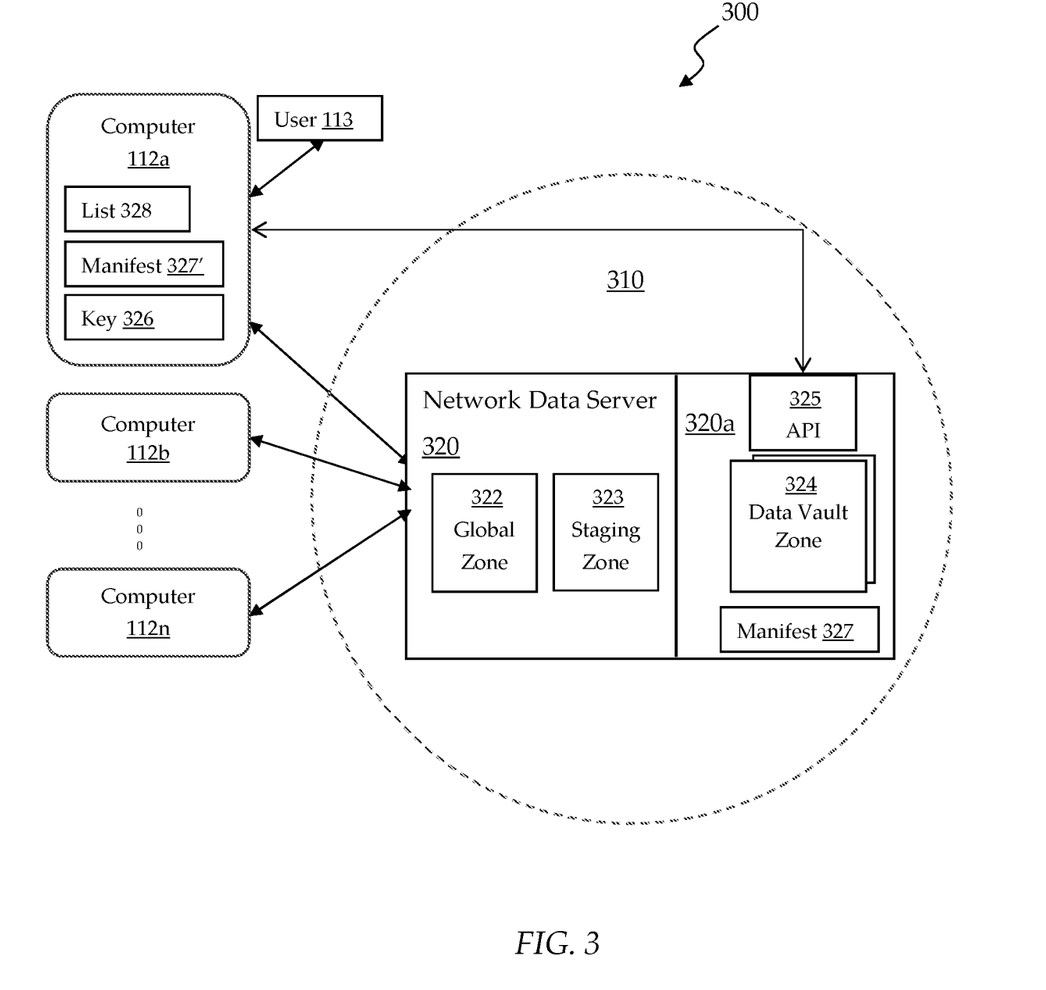
FIG. 3 is block diagram of a virtual air-gapped system.

Referring to FIG. 3, a system 300 with virtual air-gapping of data capability is shown. The system 300 is comprised of a Network Data Server 320 that is configured with and to generate zoned datasets 323, 324. A virtual air-gapped network storage 310 is shown. The Network Data Server 320 can be mounted by various computers 112*a*-112*n* or other systems. The various computers 112*a*-112*n* can include a list 328 of files. The Network Data Server 320 provides data storage services to the computers 112*a*-112*n*, for all or part of the data in the Global Zone 322 consistent with user or system permission settings. The Staging Zone 323 and Data Vault Zone 324 are used to create a virtual mantrap for data, files, trees of directories, or combination thereof found in the Global Zone. A Global Zone 322, or parts of it, can be mounted and accessed by the computers 112*a*-112*n* connected to the Network Data Server 320. The Staging Zone 323 data, taken from or generated from the Global Zone 322 data, is data that can only be assigned to one Data Vault Zone 324 at a time.

Each zone 322-324 can be encrypted and has a unique encryption key 328 for each zone. The same encryption and key 328 can be used in the Staging Zone 323 and the Data Vault Zone 324, which reduces the processing required for encrypting and decrypting the data during reallocation between zones. These encryption keys 328 will be owned and managed by a user 113 or system that owns the vaulted data in the Data Vault Zone 324. The encryption key 328 can be unique for each Data Vault Zone 324 created. The Network Data Server 320 includes an API 325 for interfacing with a Data Vault Zone 324. The API 325 controls access to the data in the Data Vault Zone 324 and provides information from an associated manifest 327. Each Data Vault Zone 324 has an associated manifest 327. The manifest is generated when the data being vaulted is indexed. The manifest 327 contains metadata regarding the vaulted files that can include a hash for each file. The user 113 can keep a copy of the manifest 327' or request a copy of the manifest 327 from the API 325 or both. These manifests 327 and 327' including the file hashes can be used to validate files received from the Data Vault Zone 324.

The Staging Zone 323 on the Network Data Server 320 is re-zoned (virtually manipulated as an atomic unit) to create Data Vault Zone 324. The Data Vault Zone 324 is part of the Network Data Server 320*a* but is protected behind the API 325. This is the equivalent to closing the first door on the virtual mantrap. The Data Vault Zone 324 data can no longer be mounted by the computers 112*a*-112*n* on the unprotected network. The Data Vault Zone 324 data can be encrypted with a different key than that of the Global Zone 322 or Staging Zone 323. As part of generating or reallocating the data to the Data Vault Zone 324, the Staging Zone 323 can be indexed, verified, and copied into a new location not accessible by the computers 112*a*-112*n*. If offsite storage is required, a removable disk can be attached, and under control of the API the Data Vault Zone 324 data and data replicated for manual offsite transfer (hand carried). In some embodiments, the removable disk is destroyed (crypto erased) before being mounted or having the Data Vault Zone 324 written to the drive.

Figure 4:
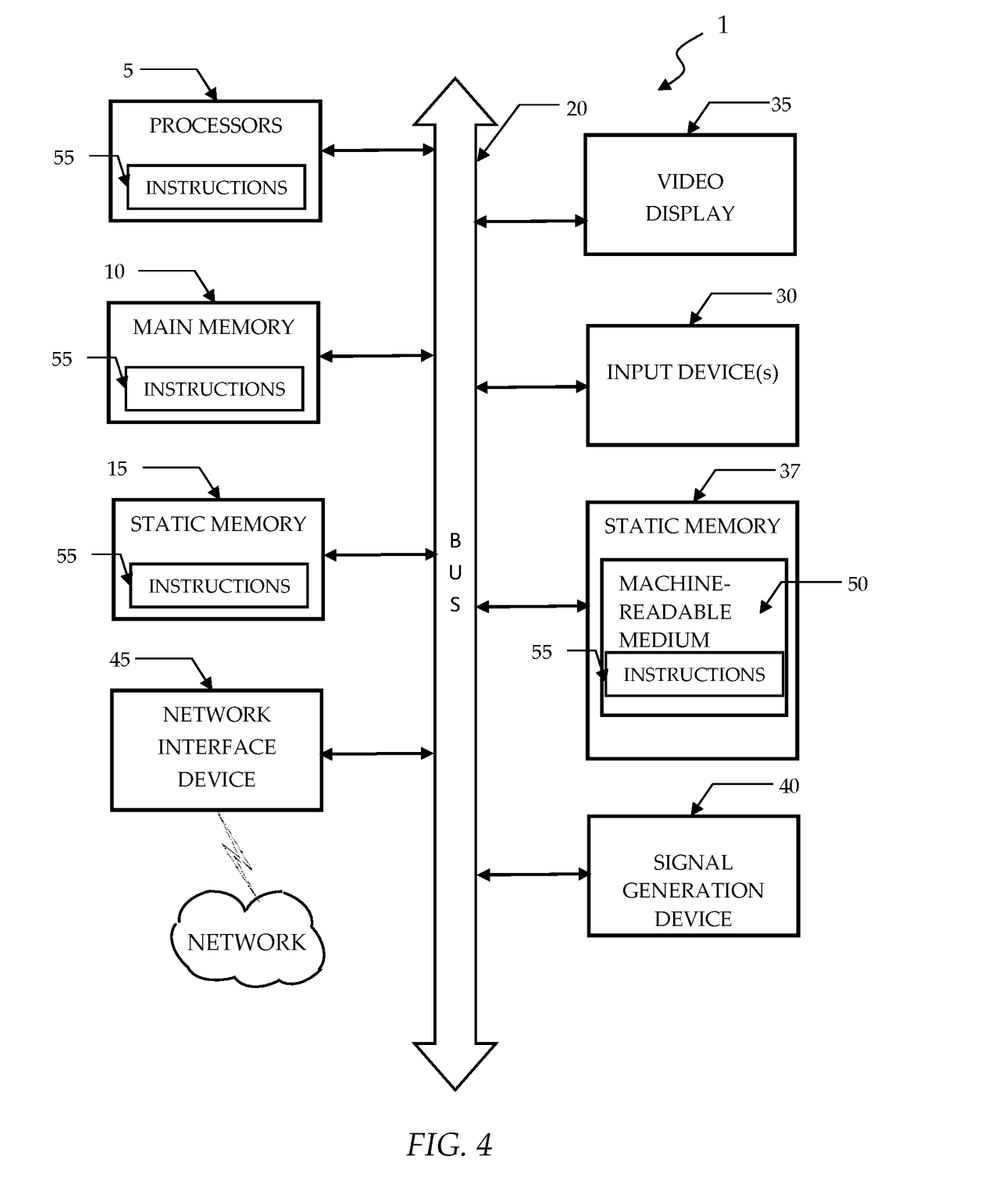
FIG. 4 is a schematic diagram of an example computing device that can be utilized to implement aspects of the present technology.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), Digital Signal Processor, or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method of providing a virtual air-gapping of data in a network storage system, the method comprising:
    creating a staging zone around a set of data within a global zone accessible over a network by the network storage system, the network storage system comprising a network data server;
    indexing the set of data within the staging zone of the network data server;
    reallocating the set of data in the staging zone, through at least one of a network file system and an operating system, by:
        transforming the set of data within the staging zone to become a staging dataset that is not mountable by the network data server; and
        creating a data vault containing vaulted data, the vaulted data being based on the staging dataset, the vaulted data being isolated from the global zone and logically disconnected from the network file system, the vaulted data further being accessible only to users that are permitted to access the vaulted data through an Application Programming Interface (API) of the network data server using a user encryption key;
    verifying the vaulted data; and
    destroying the staging zone.

2. The method of claim 1, wherein the set of data includes one or more files and a directory of files.

3. The method of claim 2, wherein the indexing the set of data within the staging zone generates one or more manifest files, and wherein the reallocating the set of data within the staging zone includes reallocating the one or more manifest files.

4. The method of claim 3, wherein the one or more manifest files includes a hash of each of the one or more files.

5. The method of claim 4, wherein the verifying the vaulted data includes:
    generating a vault manifest of the vaulted data;
    generating one or more vault hashes for each file in the vaulted data; and
    determining if the one or more manifest files match the one or more files.

6. The method of claim 1, further comprising encrypting the staging zone before reallocating the set of data in the staging zone to the data vault.

7. The method of claim 1, wherein control for validation and access to the vaulted data is through the API.

8. The method of claim 1, wherein access to the API is limited to users with specific access rights.

9. The method of claim 1, where the API provides a copy of a vault manifest.

10. A system for providing virtual air-gapping of data in a network storage system, the system comprising:
    a computational device;
    a data storage medium; and
    one or more network interfaces, wherein the computational device is configured to:
        create a staging zone around a set of data within a global zone accessible over a network by the network storage system, the network storage system comprising a network data server;
        index the set of data within the staging zone of the network data server;
        reallocate the set of data in the staging zone, through at least one of a network file system and an operating system, by:
            transforming the set of data within the staging zone to become a staging dataset that is not mountable by the network data server; and
            creating a data vault containing vaulted data, the vaulted data being based on the staging dataset, the vaulted data being isolated from the global zone and logically disconnected from the network file system, the vaulted data further being accessible only to users that are permitted to access the vaulted data through an Application Programming Interface (API) of the network data server using a user encryption key;
        verify the vaulted data; and
        destroy the staging zone.

11. The system of claim 10, wherein the set of data includes one or more files and a directory of files.

12. The system of claim 11, wherein the indexing the set of data within the staging zone generates one or more manifest files, and wherein the reallocating the set of data within the staging zone includes reallocating the one or more manifest files.

13. The system of claim 12, wherein the one or more manifest files includes a hash of each of the one or more files and the directory of files.

14. The system of claim 12, wherein the verifying the vaulted data includes:
  generating a vault manifest of the vaulted data;
  generating one or more vault hashes for each file in the vaulted data; and
  determining if the one or more manifest files match the one or more files.

15. The system of claim 10, further comprising encrypting the staging zone.

16. The system of claim 10, wherein control for validation and access to the vaulted data is through the API.

17. The system of claim 10, wherein access to the API is limited to specified users with specific access rights.

18. The system of claim 10, where the API provides a copy of a vault manifest.

19. A method of providing a virtual air-gapping of data in a network storage system, the method comprising:
  creating a staging zone around a set of data that includes one or more files and a directory tree of files within a global zone accessible over a network by the network storage system, the network storage system comprising a network data server;
  indexing the set of data within the staging zone of the network data server, wherein the indexing the staging zone generates one or more manifest files and generates a hash for each of the one or more files and the directory of files;
  encrypting the one or more files and the directory tree of files;
  reallocating the set of data in the staging zone, through at least one of a network file system and an operating system, by:
    transforming the set of data within the staging zone to become a staging dataset that is not mountable by the network data server;
    reallocating the one or more manifest files; and
    creating a data vault containing vaulted data, the vaulted data being based on the staging dataset, the vaulted data being isolated from the global zone and logically disconnected from the network file system, the vaulted data further being accessible only to users that are permitted to access the vaulted data through an Application Programming Interface (API) of the network data server using a user encryption key;
  decrypting the one or more files and the directory tree of files;
  verifying the vaulted data, wherein the verifying the vaulted data includes:
    generating a vault manifest of the vaulted data;
    generating one or more vault hashes for each file in the vaulted data; and
    determining if the one or more manifest files match the one or more files;
  and
  destroying the staging zone.

20. The method of claim 19, wherein control for validation and access to the vaulted data is through the API, wherein access to the API is limited to users with specific access rights.

21. The method of claim 1, further comprising encrypting the set of data in the staging zone.

22. The method of claim 21, wherein the vaulted data is encrypted with a different encryption key than that of the staging zone.

* * * * *

UNITED STATES PATENT AND TRADEMARK OFFICE
CERTIFICATE OF CORRECTION

PATENT NO. : 12,216,779 B2
APPLICATION NO. : 17/519124
DATED : February 4, 2025
INVENTOR(S) : Eric Bednash and Jonathan Halstuch Page 1 of 1

It is certified that error appears in the above-identified patent and that said Letters Patent is hereby corrected as shown below:

In the Claims

In Column 10, Lines 39-67, Claim 10 should state as follows:
"10. A system for providing virtual air-gapping of data in a network storage system, the system comprising:
a computational device;
a data storage medium; and
one or more network interfaces, wherein the computational device is configured to:
    create a staging zone around a set of data within a global zone accessible over a
        network by the network storage system, the network storage system comprising a
        network data server;
    index the set of data within the staging zone of the network data server;
    reallocate the set of data in the staging zone, through at least one of a network file
        system and an operating system, by:
            transforming the set of data within the staging zone to become a staging
                dataset that is not mountable by the network data server; and
            creating a data vault containing vaulted data, the vaulted data being based on
                the staging dataset, the vaulted data being isolated from the global
                zone and logically disconnected from the network file system, the
                vaulted data further being accessible only to users that are permitted
                to access the vaulted data through an Application Programming
                Interface (API) of the network data server using a user encryption
                key;
    verify the vaulted data; and
    destroy the staging zone."

Signed and Sealed this
Twenty-seventh Day of May, 2025

Coke Morgan Stewart
*Acting Director of the United States Patent and Trademark Office*